United States Patent Office 3,252,637
Patented May 24, 1966

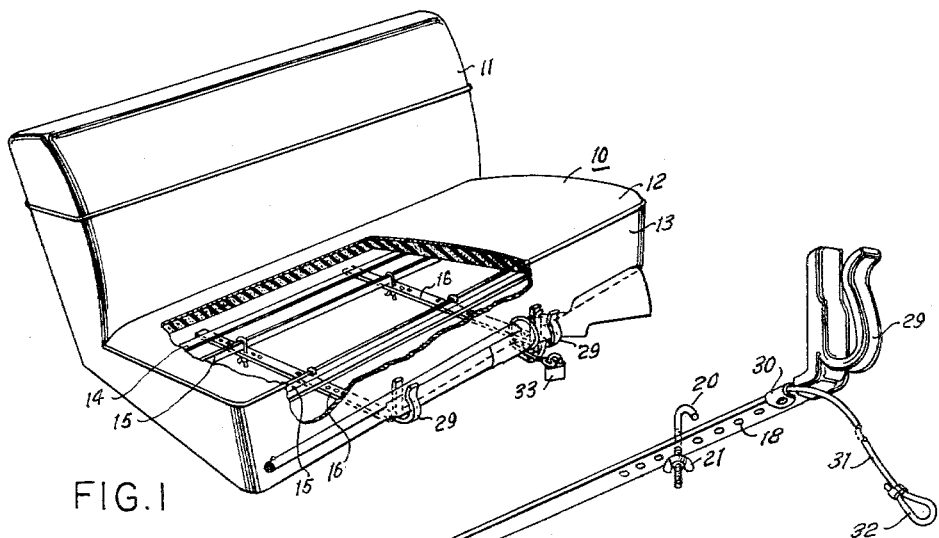
FIG. 1
FIG. 2
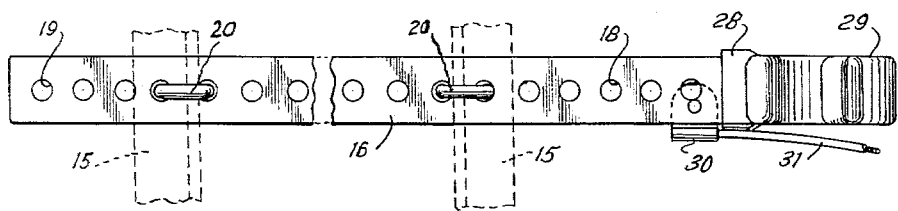
FIG. 3
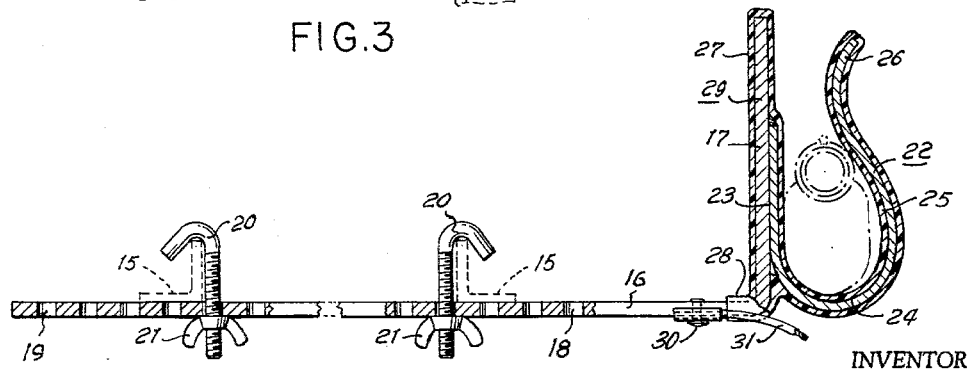
FIG. 4
INVENTOR
Raymond V. Hart
BY *Ehley & Ehley*
ATTORNEYS

3,252,637
GUN RACK FOR MOTOR VEHICLES
Raymond V. Hart, San Angelo, Tex., assignor to San Angelo Die Casting and Manufacturing Co., Inc., San Angelo, Tex., a corporation of Texas
Filed Sept. 4, 1964, Ser. No. 394,534
4 Claims. (Cl. 224—1)

This invention relates to new and useful improvements in a gun racks for motor vehicles.

There are many instances in which it is desirable to provide means for transporting firearms such as rifles and shotguns in motor vehicles in a safe, secure, and theft-proof manner, for utilization by persons embarking upon hunting trips, law enforcement officers and the like.

It is, therefore, a principal object of this invention to provide an improved gun rack for motor vehicles adapted to support a firearm such as a rifle or shotgun across the front panel of a seat within the vehicle so as to be readily accessible yet so disposed as to be out of the way and so as not to hamper the normal and usual operation of the vehicle.

A further object of the invention is to provide an improved gun rack for motor vehicles having means for securing the firearm in the gun rack and preventing its theft therefrom.

Still another object of the invention is to provide an improved gun rack for motor vehicles having means for holding the gun securely in position while protecting the gun against damage thereto from the rack under the usual and normal operating conditions of the motor vehicle.

An additional object of the invention is to provide an improved gun rack for motor vehicles adapted to be secured to the existing framework on the underside of a seat in the motor vehicle and having means for holding a firearm, such as a rifle or shotgun, securely and snugly against the forward panel of the lower portion of the seat.

Other and more particular objects of the invention will be apparent from the reading of the following specification.

A construction designed to carry out the invention will be hereinafter described, together with other features of the invention.

The invention will be more readily understood from a reading of the following specification and by reference to the accompanying drawing, wherein an example of the invention is shown, and wherein:

FIG. 1 is a view in perspective, partially broken away and illustrating a gun rack constructed in accordance with this invention, FIG. 2 is a view in perspective of one of the rack bars showing the theft-preventing means, FIG. 3 is an enlarged plan view, partly broken away, one of the gun rack bars, and FIG. 4 is a side elevational view, partly in elevation and partly in section, the view being partly broken away and showing the structure of one of the gun rack bars.

In the drawing, the numeral 10 designates a conventional motor vehicle seat which may be either the front seat or the back seat, more usually the front seat. The seat 10 has the usual back 11, and seat 12 having a front panel 13, the seat 12 having conventional framing or support members 14 extending transversely of the motor vehicle. The gun rack of this invention, as will appear more fully, may be secured to the frame members 14, or may be secured, if desired, to auxiliary frame members 15 also extending transversely of the motor vehicle. In most instances, the existent frame members 14 will be utilized.

The gun rack includes a pair of elongate bars 16 having short upwardly-extending arms 17 at one end, a series of closely-spaced openings 18 adjacent the arm 17 and a second series of closely-spaced openings 19 adjacent the opposite end of the bar, the openings 18 and 19 extending through the thickness of each of the bars 16. A pair of screwthreaded hook bolts 20 are received in selected ones of the openings 18 and 19 projecting upwardly above the bars 16 and receiving wing nuts 21 on the underside of each of the bars. The hook bolts 20 may be engaged with the auxiliary transverse frame members 15, as shown in the drawing, or more often and more desirably, may be engaged with the existent frame members 14. Obviously, by tightening the wing nuts 21 on the hook bolts 20, the bars 16 may be securely clamped to the underside of the seat 12, and by judicious selection of the frame members 14 or 15 and selective positioning of the bolts 20 in the openings 18 and 19, the upstanding arm 17 may be positioned closely adjacent and substantially in contact with the front 13 of the seat.

Each of the short upstanding arms 17 has secured to its forward face, as by welding or otherwise, an upright U-shaped clip 22 having a rectilinear rearward arm 23 of somewhat less length than the arm 17, a curvilinear, downwardly-concave bottom portion 24 positioned approximately in the longitudinal plane of the bars 16, and a forward arm 25 curving outwardly from the bottom 24 and inwardly toward the arm 17 and again outwardly at its upper end 26, the clips 22 being formed of spring metal and being shaped as described for downward insertion of the firearm and spring-like resilient clamping or retaining of the firearm within the clips 22. The entire exterior surfaces of the clips 22 and the arms 17 are enclosed in a suitable casing 27 formed of an elastomer-like substance, such as a plastic, resilient, relatively soft synthetic resin. As shown at 28, the casing 27 extends rearwardly from the arms 17 a short distance over the exteriors of the bars 16. Thus, a pair of resin-coated or elastomer-coated clips, designated generally by the numeral 29, are provided for the reception and secure retention of a firearm, the clips being provided with surface coatings which protect the firearm against scratching or abrading, but yet which hold the firearm securely in position.

For preventing theft or unauthorized removal of the firearm from the clips 29, one of the bars 16 has secured thereto by a retaining member 30 an elongate, resin-coated metal cable 31 provided at its outer end with a closed loop 32.

In use, the bars 16 are positioned in parallel, spaced-apart relationship against the underside of the seat 12, one of the bars being positioned for its clip 29 to receive the barrel or the forward stock portion of the firearm, and the other of the bars 16 which carries the cable 31 being positioned for its clip 29 to receive the stock of the firearm closely adjacent the trigger guard thereof. The firearm is then pressed downwardly into the resilient clips 29, the cable 31 is passed through the trigger guard of the firearm, upwardly and around the firearm and again through the trigger guard with a lock 33 being engaged in the loop 32. Since the lock 33 cannot be passed through the trigger guard due to its size, the firearm is thus securely locked into the clips 29 to prevent theft of the firearm or unauthorized removal of the firearm from at least one of the clips 29.

The gun rack described is simple yet very effective in structure and function, being easily installed in a few moments beneath the seat of a motor vehicle and functioning to carry and support a firearm for ready access yet in an out-of-the-way position with provision being made for preventing theft or otherwise undesired removal of the firearm from the gun rack.

The foregoing description of the invention is explanatory thereof and various changes in the size, shape and materials, as well as in the details of the illustrated construction may be made, within the scope of the appended claims without departing from the spirit of the invention.

What I claim and desire to secure by Letters Patent is:

1. A gun rack for motor vehicles for securing to the underside of a seat in the vehice including a pair of elongate bars adapted to be secured to the underside of a vehicle seat extending in spaced parallel relationship across the longer dimension of the seat, means for securing the bars to the underside of the seat, a short arm extending upwardly from the forward end of each bar so as to extend upwardly in close adjacency to the front panel of the seat for receiving a rifle or shotgun, a resilient upwardly extending U-shaped clip secured to the front side of each arm, and a cushioning coating on each of the clips.

2. A gun rack as set forth in claim 1 and an elongate flexible locking member having one end secured to one of the bars and having a closed loop on its other end, the locking member being of a length sufficient to extend at least once through the trigger guard of a gun received in the clips.

3. A gun rack as set forth in claim 1 wherein the clips have upwardly convergent legs, the forward or outer leg having its upper end curving outwardly of forwardly.

4. A gun rack as set forth in claim 1 wherein the cushioning coat also encloses the arms.

References Cited by the Examiner

UNITED STATES PATENTS

| | | | |
|---|---|---|---|
| 492,740 | 2/1893 | Copeland | 224—1 |
| 636,295 | 11/1899 | Sibthorpe | 224—1 |
| 2,750,088 | 6/1956 | Agostine et al. | 224—29 |
| 2,929,539 | 3/1960 | Safreno | 21—124 X |

HUGO O. SCHULZ, *Primary Examiner.*